United States Patent [19]

Fehrenbach et al.

[11] Patent Number: 6,014,100
[45] Date of Patent: Jan. 11, 2000

[54] TWO-WIRE RADAR SENSOR WITH INTERMITTENTLY OPERATING CIRCUITRY COMPONENTS

[75] Inventors: Josef Fehrenbach, Haslach; Karl Griesbaum, Muhlenbach, both of Germany

[73] Assignee: Vega Grieshaber KG, Schiltach, Germany

[21] Appl. No.: 09/031,992

[22] Filed: Feb. 27, 1998

[51] Int. Cl.[7] ................................................ G01S 13/32
[52] U.S. Cl. ................................................ 342/124
[58] Field of Search ........................................... 342/124

[56] References Cited

U.S. PATENT DOCUMENTS

| | | | |
|---|---|---|---|
| 4,146,834 | 3/1979 | Maltby et al. | 324/60 R |
| 4,656,353 | 4/1987 | Thompson | 250/231 R |
| 4,661,817 | 4/1987 | Bekkadal et al. | 342/124 |
| 4,742,574 | 5/1988 | Smith et al. | 455/608 |
| 5,621,177 | 4/1997 | Torimaru | 73/861.16 |
| 5,672,975 | 9/1997 | Kielb et al. | 324/644 |

*Primary Examiner*—John B. Sotomayor
*Attorney, Agent, or Firm*—Schwegman, Lundberg, Woessner & Kluth PA

[57] ABSTRACT

An improved RADAR sensor for measuring the level of material utilizes conventional medium- or high-power microwave transmitter and microwave receiver devices, while utilizing only the relatively small amount of current supplied by a conventional low current two-wire process control loop. A transmit/receive unit and a control unit are operated intermittently to generate readings, and are set to a current-saving or even currentless standby mode between these periods of active measurement. During the inactive standby period, circuit components such as capacitors collect and store power to be used for the comparably high-power requirement during the active measurement cycles. The inactive standby periods are preferably long compared to the duration of the measurement periods. This permits operation with power entirely supplied from a common two-wire 4–20 mA process control loop.

5 Claims, 1 Drawing Sheet

TWO-WIRE RADAR SENSOR WITH INTERMITTENTLY OPERATING CIRCUITRY COMPONENTS

The present invention is directed to systems using a microwave level gauge for indicating a level of material in a storage vessel or the like and more particularly to an improved such two-wire system with intermittently operating circuitry components.

BACKGROUND OF THE INVENTION

A number of devices using microwaves for indicating point-level of material in a storage container or vessel have heretofore been proposed and made commercially available. For example, U.S. Pat. No. 4,661,817 discloses an apparatus for measuring the distance to an object, particularly the distance to the surface of a liquid in a container. The basic concept involves transmitting microwaves toward the product surface and receiving reflected microwave energy from the surface. The reflected microwaves are analyzed to determine the distance that they have traveled. Knowledge of distance traveled and storage vessel height allows determination of product level. This can, for example, be achieved applying the well-known FMCW (frequency modulated continuous wave) technique or pulse-RADAR technique.

FMCW uses a linear modulated triangle or saw-tooth signal. It is obvious that the modulation time must be longer than the time of flight of the signal. The received signal has the same characteristics as the transmitted signal, but is delayed by the flight time. Both signals are mixed, thus yielding a frequency difference which in being directly proportional to the distance to be detected between antenna and object.

Pulse measurement systems are simple time-of-flight systems wherein short microwave pulses are transmitted and a reflected microwave signal is received. The distance is proportional to the time measured between sending and receiving the pulse. A commercially available pulse-RADAR sensor is, for example, the VEGA-Puls 64 FV device made by VEGA, Germany.

One accepted standard in the process control industry is the use of 4–20 mA process control loops. By this standard, a 4 mA signal represents a zero reading and a 20 mA signal represents a fill-scale reading. If the transmitter only requires sufficiently low power, it is possible to power the transmitter using current from a two-wire loop. This avoids the need for a four-wire setup, with separate power supply and signal transmission wires, and is therefore highly desirable.

Hitherto, an obstacle to this is the high-power requirement of most available microwave sources and receivers. U.S. Pat. No. 5,672,975 suggests a 4–20 mA two-wire level transmitter comprising a low-power microwave source and a low-power microwave receiver. It is not disclosed how such low-power components could be obtained, and U.S. Pat. No. 5,672,975 thus appears to be based more on a theoretical than a practical solution. In any case, all available low-power semiconductor transmitters are very expensive. Moreover, as a result of poor converting efficiency, they are characterized by exceptionally low transmission power, thus only yielding very weak reflected signals. To obtain a sufficiently exact measurement, it therefore would in effect be necessary, in many instances, to operate the level measurement system in a four-wire configuration rather than with a two-wire line. The additional wires are required to supply adequate operating power to the transmitting device, thereby sacrificing, however, the important benefits of a two-wire system.

SUMMARY OF THE INVENTION

In view of the foregoing, the main object of this invention is to provide a RADAR sensor for indicating level of material, which on the one hand utilizes conventional customary microwave transmitter and microwave receiver devices, both typically requiring middle or even high power, and which on the other hand is powered by a small current supplied by means of a two-wire process control loop.

A further object of the invention is to provide a two-wire RADAR sensor of the above type which despite low-cost construction, operates efficiently and yields reliable results. Briefly stated, these objects are attained by a RADAR sensor with a transmit/receive unit and a control unit which operates intermittently to generate a reading, and are set to a current-saving or even currentless standby mode between these periods of active measurement. The inactive standby period between active operation is preferably long, compared to the duration of the measurement period. Therefore, in spite of a comparably large power input during the measurement period, a many times lower mean power requirement results which, consequently, can easily be made available through a 4–20 mA process control loop. During the inactive standby period, circuitry components like capacitors and accumulators are collecting and temporarily storing power to be used for the comparably high-power requirement during the active measurement cycles.

The invention will now be further described in terms of the best embodiment, presently known to the applicant.

DETAILED DESCRIPTION OF THE PREFERRED EMBODIMENT

Figure 1:
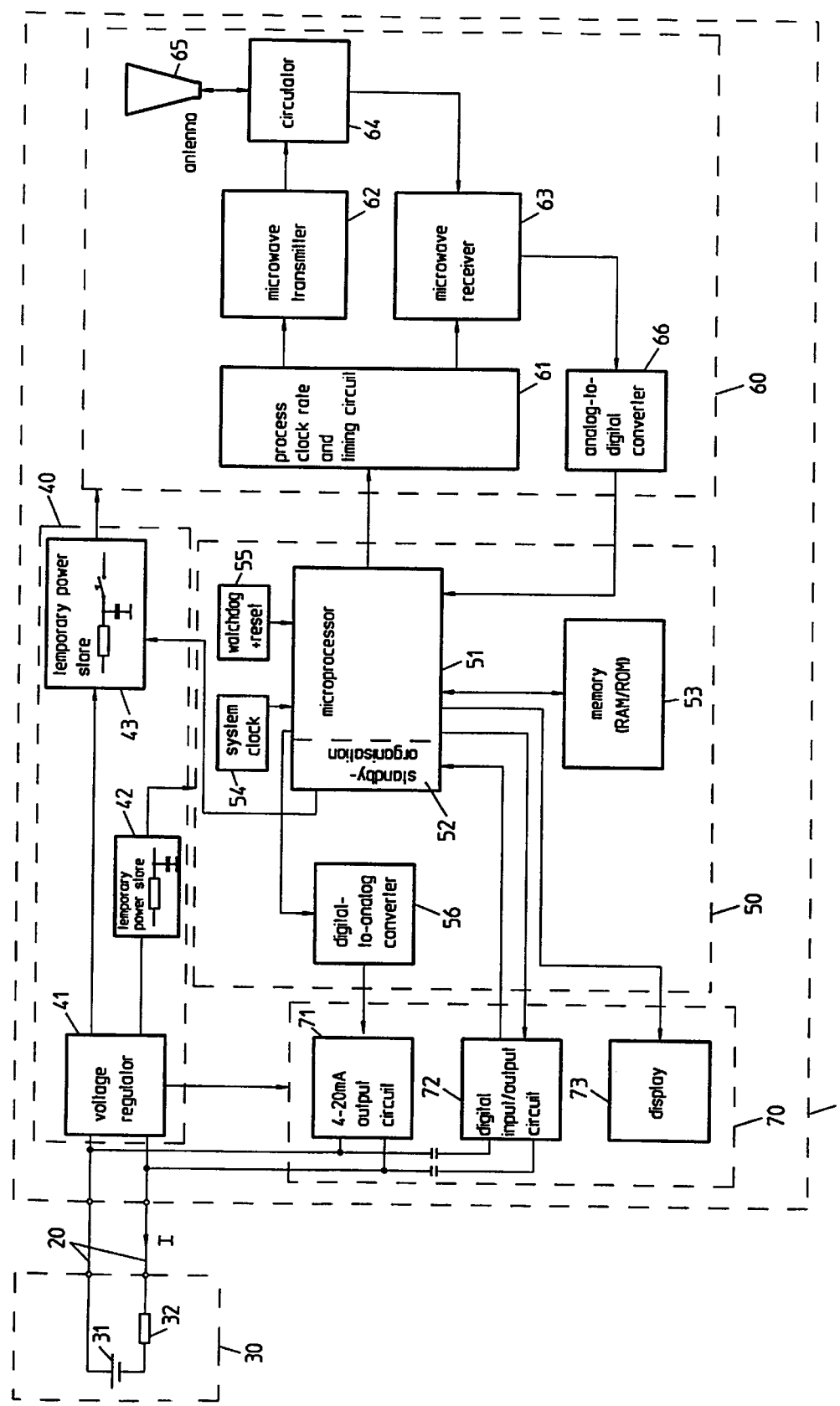
FIG. 1 is a block diagram of an intermittently operating RADAR sensor in accordance with the invention.

FIG. 1 schematically shows an intermittently operating RADAR sensor (10) coupled to a process control room (30) by a two-wire process control loop (20). Two-wire loop (20) is a 4–20 mA process control loop. The RADAR sensor (10) is completely powered by current flowing through control loop (20). Process control room (30) is shown to comprise a voltage source (31) and a resistor (32), but will be understood to be provided with equipment for providing display output related to material level which is transmitted over loop (20). The display output signal is analogous, i.e., in the form of a small current (4–20 mA) through loop (20), and can be accompanied by the digital form.

RADAR sensor (10) comprises a power supply unit (40), a control unit (50), a unit for transmission and receipt of microwaves (60) and an input/output unit (70).

Control unit (50) includes a microprocessor (51), system clock (54), watchdog and reset circuit (55), memory (53) and a digital-to-analog converter (56). The RADAR sensor operates as controlled by microprocessor (51) in accordance with instructions stored in memory (53) which is coupled to the microprocessor. Operation of microprocessor (51) is determined by system clock (54) and reset and watchdog circuit (55).

Input/output unit (70) includes an analog 4–20 mA output circuit (71) and digital input/output circuit (72) as well as a display (73) providing a display output. Analog output circuit (71) receives input from digital-to-analog converter (56) and provides output to process control room (30). Microprocessor (51) is directly coupled to both digital input/output circuit (72) and display (73) and provides an input related to material level.

Transmission and receipt unit (60) includes process timing and clock rate circuitry (61), microwave transmitter (62), microwave receiver (63), circulator (64), analog-to-digital converter (66) and antenna (65). Microprocessor (51) initiates process timing and clock rate circuitry (61) to generate a reading which is to indicate material level in a tank. Process timing and clock rate circuitry (61) allows operation of microwave transmitter (62) and antenna (65) to transmit microwaves as well as microwave receiver (63) to receive incoming signals. Circulator (64) electrically isolates transmit and receive circuits from each other.

Process timing and clock rate circuitry (61) may comprise, for instance, dependent on level measurement technique, a control circuit to time periods of transmission and receipt of microwaves, and clock circuits for both microwave transmitter and receiver. Microwave receiver (63) is connected to an analog-to-digital converter (66) to provide an input relating to the distance from the reflector of the incoming signal. Microprocessor (51) is coupled to analog-to-digital converter (66) to receive digitized measurement output from the microwave receiver. Further, digitized output is stored in memory (53) and information about reflector distance is extracted according to instructions in memory. Output based upon reflector distance and thus indicating material level is then provided to input/output unit (70) to finally reach process control room (30).

Power supply unit (40) comprises a voltage regulator (41) and temporary power stores (42), (43) to power the RADAR sensor. The power supply unit is coupled to process control room (30) to receive power through the two-wire process control loop (20), and is connected to control unit (50), input/output unit (70) and transmission/receipt unit (60) to then provide regulated voltage output by using said voltage regulator (41). Transmit/receipt unit (60) and control unit (50) are connected to voltage regulator (41) via temporary power stores (42), (43). While these units are only powered intermittently, input/output unit (70) is not set into inactive standby mode. Being permanently active, input/output unit (70) is therefore directly coupled to voltage regulator (41).

Basically, signal generation and processing during and after measurements are as described, for instance in U.S. Pat. No. 5,627,975, which is hereby incorporated by reference. The following description will accordingly not recite all details of, especially, signal processing, since this is conventional.

In a complete measurement cycle, the microprocessor initiates process clock rate and timing circuit (61) to transmit microwaves and to receive reflected incoming signal. Further, the microprocessor determines the distance of the reflector from the digitized output of the analog-to-digital converter, which is supplied with the incoming signal from the microwave receiver. The result is transferred to input/output unit to be displayed, thus indicating the material level.

In contrast with the operation of the sensor suggested in U.S. Pat. No. 5,627,975 following an active cycle of transmission and receipt of signal, the transmission/receipt unit (60) is completely switched off via temporary power store (43) and is inoperative until the start of the next active cycle. Being switched off, transmission/receipt unit (60) uses no power and while this situation continues, corresponding temporary power store (43) is allowed to recharge. After signal processing and transferring output to input/output unit (70), control unit (50) is set into current-saving standby mode until the next measurement cycle is restarted, or an inquiry from the process control room transmitted via digital input/output circuit (72) is received. Temporary power store (42) coupled to control unit (50) provides power in standby mode and active period. Further, temporary power store (42) is allowed to recharge during standby mode of control unit (50). The microprocessor comprises an additional device which organizes the inactive standby mode of the RADAR sensor, i.e., initiates the standby mode of control unit (50) and switch on/switch off of current of transmission/receipt unit (60). If the input voltage of power supply unit (40) is 12 V and the level gauge electronics are provided with 4 mA, in the one extreme case of using a two-wire 4–20 mA process control loop, the RADAR sensor operates consuming 48 mwatts in total of electrical power. Voltage regulator (41) efficiently converts these 48 mwatts into a usable supply voltage which leaves, say, 40 mwatts available. Further, permanently active input/output unit (70) and inactive standby mode of control unit (50) require, for example, 10 mwatts each, which leaves 20 mwatts for the active period of the control unit (50) and the active period of transmission/receipt unit (60). Speed of light ($3 \times 10^8$ m/sec) determines the time delay between transmission and receipt of reflected microwaves. With a reflector distance of the order of 30 meters, as typically found in filling level measurements, time delay never exceeds 200 nsec.

Using standard signal-generating and evaluation techniques, RADAR sensors require an average of, for instance, 10,000 single measurements, to yield sufficiently exact readings. Therefore, an active time of the transmission/receipt unit of only 2 msec is necessary, comprising 10,000 single cycles with an active period of 200 nsec each (10,000×200 nsec=2 msec). During this active measurement period, the microprocessor can also be active to determine reflector distance from incoming data and to transfer it to the input/output unit. Thus, after 10,000 measure cycles, of a duration of 2 msec in total, the transmission/receipt unit (60) can be completely switched off and also the control unit (50) can be set into current-saving standby mode.

Typically, slow changes in filling level in a tank only require about 1 measurement/sec. Therefore, control unit and transmission/receipt unit may stay in their standby and currentless modes, respectively, for 998 msec after the active measurement period of 2 msec. The permanently available average power of 20 mwatts is thus accumulating during the long-lasting inactive period to a total of about 10 watts (998 msec/2 msec * 20 mwatts=9.98 watts), available for the active period of control unit as well as transmission/receipt unit. Therefore, both control unit as well as transmission/receipt unit are supplied with a power input of about 10 watts, during their active period of 2 msec.

It is known that operating microprocessors usually require a power provision of not more than 100 mwatts which leaves almost all of the approximately 10 watts to operate the transmission/receipt unit. This makes it possible to use medium- or high-power components, at corresponding high signal quality, in a two-wire system. Although the invention's RADAR sensor is powered by a 4–20 mA two-wire process control loop, conventional and customary microwave transmitter and microwave receiver components requiring middle and even high-power input can be utilized if the circuitry components are intermittently operated and set into current-saving and/or currentless standby mode at intervals between the active periods.

Although this invention has been disclosed by reference to a presently preferred embodiment thereof, modifications and variations may be implemented without departing from the principle of the invention in their broadest aspects.

What is claimed is:

1. A RADAR sensor for measuring height of a product in a container coupleable to a two-wire process control loop comprising:

a transmission/receipt unit operative when activated in a measurement period to transmit and receive microwaves to and from the product whose height is to be determined;

a control unit coupled to the transmission/receipt unit for initiating transmission and receipt of microwaves and determination of product height based upon the received reflected signal;

an input/output unit coupled to the control unit and to the two-wire process control loop for transmitting information related to measurement of product height over the loop;

a power supply circuitry coupled to the two-wire process control loop for receiving power from the loop to provide the source of power for the power-consuming components of the sensor including the transmission/receipt unit, the control unit, and the input/output unit, wherein the power supply circuitry includes a temporary power store operative to receive and store power at a relatively low rate consistent with the power capabilities of the process control loop during the standby intervals, and to provide a relatively higher operating power for the sensor during the active measurement periods;

wherein at least some of the power-consuming components of said sensor operate intermittently to provide active measurement periods and current-saving or currentless standby mode during intervals between the active measurement periods.

2. A RADAR sensor according to claim 1 wherein the process control loop is a 4–20 mA process control loop.

3. A RADAR sensor according to claim 1 comprising microwave transmitter and microwave receiver components requiring middle- or high-power input.

4. A RADAR sensor according to claim 2 comprising microwave transmitter and microwave receiver components requiring middle- or high-power input.

5. A RADAR sensor according to claim 1 provided with a device for controlling said standby mode.

* * * * *